US007583038B2

(12) United States Patent
Aizawa

(10) Patent No.: US 7,583,038 B2
(45) Date of Patent: Sep. 1, 2009

(54) MOTOR-DRIVING CIRCUIT AND RECORDING APPARATUS INCLUDING THE SAME

(75) Inventor: Takayuki Aizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 11/835,921

(22) Filed: Aug. 8, 2007

(65) Prior Publication Data

US 2007/0285034 A1 Dec. 13, 2007

Related U.S. Application Data

(63) Continuation of application No. 10/899,532, filed on Jul. 26, 2004, now Pat. No. 7,271,554.

(30) Foreign Application Priority Data

Jul. 30, 2003 (JP) ............................ 2003-203744

(51) Int. Cl.
*H02P 1/54* (2006.01)

(52) U.S. Cl. .......................... 318/34; 318/685; 318/696

(58) Field of Classification Search ....................... None
See application file for complete search history.

(56) References Cited

U.S. PATENT DOCUMENTS

| | | | | |
|---|---|---|---|---|
| 4,290,000 | A | | 9/1981 | Sun |
| 4,573,410 | A | * | 3/1986 | Blasius et al. ............... 101/365 |
| 4,980,838 | A | | 12/1990 | Daggett et al. |
| 5,202,611 | A | | 4/1993 | Uehara et al. |
| 5,625,268 | A | | 4/1997 | Miyanari |
| 5,952,797 | A | | 9/1999 | Rossler |
| 6,082,914 | A | * | 7/2000 | Barrus et al. ................ 400/234 |
| 6,149,544 | A | * | 11/2000 | Masberg et al. ............... 477/13 |
| 7,355,358 | B2 | * | 4/2008 | Bliley et al. .............. 318/254.1 |

FOREIGN PATENT DOCUMENTS

| | | |
|---|---|---|
| JP | 05-122988 A | 5/1993 |
| JP | 05-184194 A | 7/1993 |

* cited by examiner

*Primary Examiner*—Walter Benson
*Assistant Examiner*—Renata McCloud
(74) *Attorney, Agent, or Firm*—Canon U.S.A., Inc. I.P. Division

(57) ABSTRACT

A motor-driving circuit drives a plurality of motors of different types. The motor-driving circuit includes a plurality of H-bridge circuits for outputting driving signals to the motors, a controller for controlling the plurality of H-bridge circuits, a setting section for setting up the controller, and terminals for inputting setting data.

19 Claims, 13 Drawing Sheets

| Bit 0 | 1 | 2 | : Motor Configuration |
|---|---|---|---|
| 0 | 0 | 0 | : Stepping Motor × 2 |
| 0 | 0 | 1 | : Stepping Motor × 1+DC(S) × 2 |
| 0 | 1 | 0 | : Stepping Motor × 1+DC(L) × 1 |
| 1 | 0 | 0 | : DC(L) × 2 |
| 1 | 0 | 1 | : DC(S) × 4 |
| 1 | 1 | 1 | : DC(L) × 1+DC(S) × 2 |

MOTOR-DRIVING CIRCUIT AND RECORDING APPARATUS INCLUDING THE SAME

CROSS-REFERENCE TO RELATED APPLICATIONS

The present application is a continuation of U.S. patent application Ser. No. 10/899,532, filed Jul. 26, 2004, entitled "MOTOR-DRIVING CIRCUIT AND RECORDING APPARATUS INCLUDING THE SAME", the content of which is expressly incorporated by reference herein in its entirety. Further, the present application claims priority from Japanese Patent Application No. 2003-203744 filed Jul. 30, 2003, which is also hereby incorporated by reference herein in its entirety.

BACKGROUND OF THE INVENTION

1. Field of the Invention

The present invention relates to a motor-driving circuit and a recording apparatus including the motor-driving circuit.

2. Description of the Related Art

The motors mainly used for printers are DC motors and stepping motors. A plurality of DC motors and stepping motors are used in accordance with the type or use of the printer.

To drive these motors, four transistors form an H-bridge circuit and each transistor is turned on and off to control an electric current to drive the motors (refer to, for example, Japanese Patent Laid-Open No. 05-122988, in particular, FIG. 4 and Japanese Patent Laid-Open No. 05-184194, in particular, FIG. 8).

FIG. 10 shows an example of the configuration to drive a printer motor. This configuration includes a printer controller 100, DC motors 102 and 103, stepping motors 104 and 105, DC motor drivers 106 and 107, and stepping motor drivers 108 and 109. The configuration shown in FIG. 10 requires the motor drivers to output a driving signal to each motor.

With reference to FIG. 11, motors are connected to motor drivers in accordance with the type of motor (or the properties of the motor). Progress of semiconductor process technology has allowed a motor driver to support a plurality of motors as long as the motors are of the same type.

Unfortunately, if several types of motor are required, as shown in FIG. 12, a different motor driver is required for each type of motor, even though one motor driver can drive a plurality of motors.

Use of a plurality of motor drivers increases the cost and size of the circuit board, and thus of an apparatus including the motor drivers, such as a motor control apparatus.

SUMMARY OF THE INVENTION

According to the present invention, a motor-driving circuit for driving motors includes a plurality of H-bridge circuits for outputting driving signals to the motors, an H-bridge controller for controlling the H-bridge circuits, an H-bridge setting section for setting up the H-bridge controller, and a plurality of terminals for inputting setting data to the H-bridge setting section.

Further objects, features and advantages of the present invention will become apparent from the following description of the preferred embodiments (with reference to the attached drawings).

DESCRIPTION OF THE PREFERRED EMBODIMENTS

First Exemplary Embodiment

Figure 1:
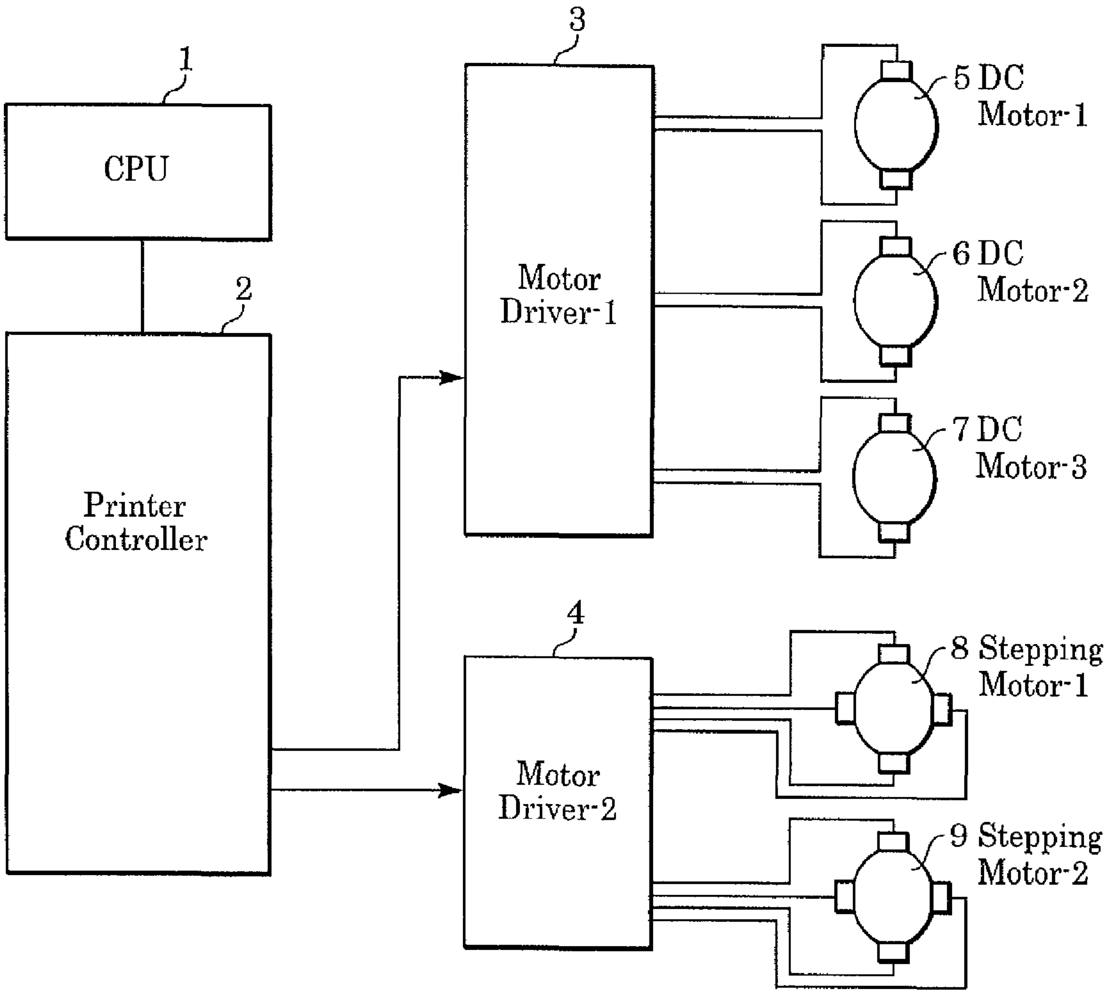
FIG. 1 is a control block diagram to drive motors according to an embodiment of the present invention.

FIG. 1 shows an exemplary configuration of an apparatus including a motor-driving circuit, which is also referred to as "motor driver" or "motor driver circuit". For example, a printer (recording apparatus) having an inkjet recording head will be described below.

A configuration shown in FIG. 1 includes three DC motors and two stepping motors, five motors in total, which are connected to two motor drivers of the same type.

As shown in FIG. 1, the configuration includes a (Central Processing Unit) CPU 1, a printer controller 2, a first motor driver 3, a second motor driver 4, a first DC motor 5, a second DC motor 6, a third DC motor 7, a first stepping motor 8, and a second stepping motor 9.

Figure 2:
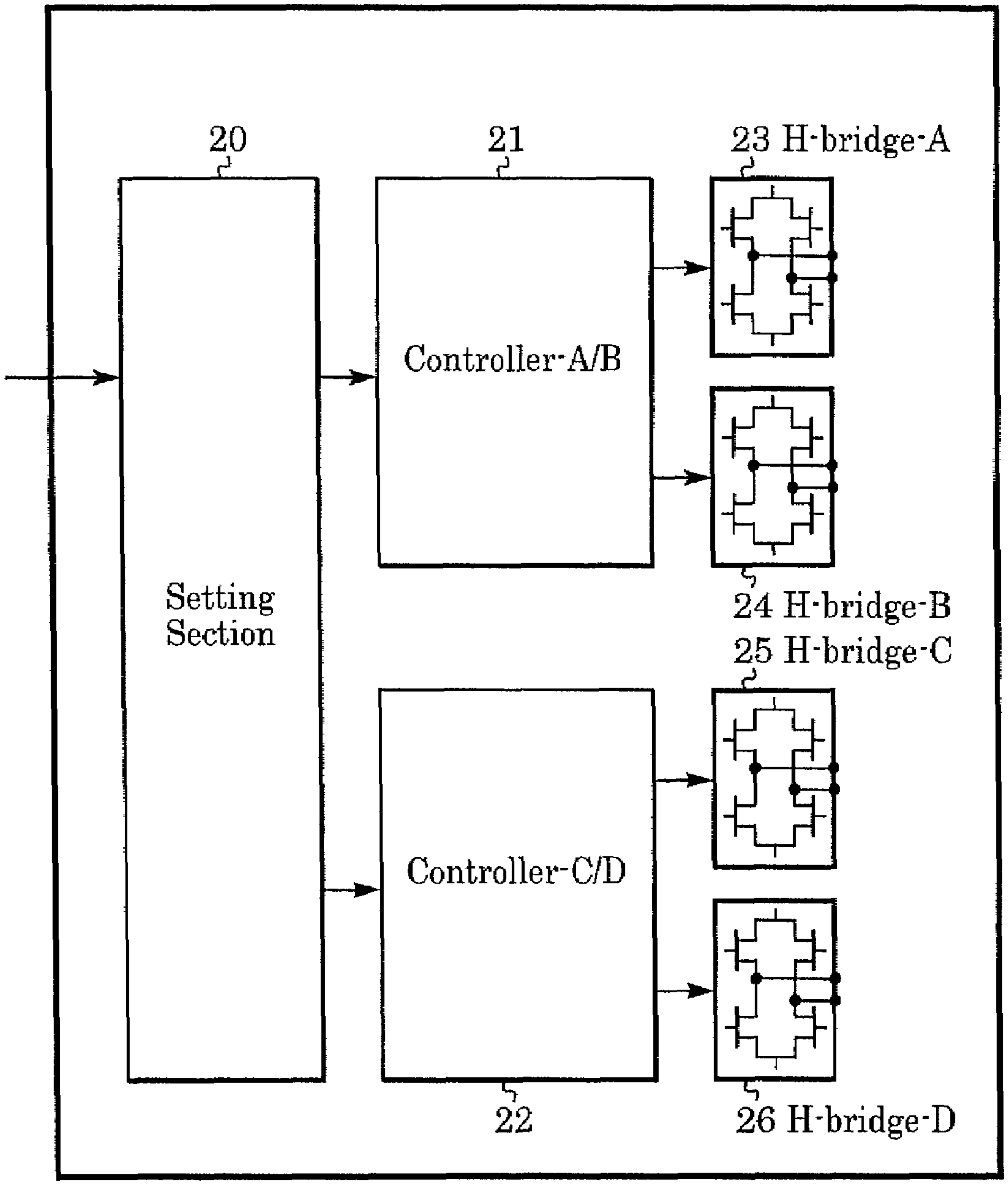
FIG. 2 is a diagram for explaining a motor-driving circuit according to the embodiment.

FIG. 2 shows a block diagram of a motor driver circuit according to the present invention. The motor driver circuit is, for example, integrated into a one-chip integrated circuit (IC). In the example shown in FIG. 2, the motor driver circuit has four H-bridge circuits. The combination of the H-bridge circuits and the motors can be changed in accordance with the types of the connected motors.

The H-bridge circuit will be briefly described below. The H-bridge circuit includes four transistors, for example, field-effect transistors, to which control signals are input. In response to the control signals, the transistors are turned on or off to change the directions of currents flowing therethrough to rotate the motors in the positive direction or negative direction.

As shown in FIG. 2, a setting section 20 determines the configuration of the H-bridges. A controller-A/B 21 controls an H-bridge-A 23 and an H-bridge-B 24. A controller-C/D 22 controls an H-bridge-C 25 and an H-bridge-D 26.

In the configuration shown in FIG. 2, to drive a stepping motor, the H-bridge-A 23 and the H-bridge-B 24 form a pair and the H-bridge-C 25 and the H-bridge-D 26 form a pair.

To drive a DC motor, the H-bridge-A 23, the H-bridge-B 24, the H-bridge-C 25, and the H-bridge-D 26 independently drive their respective motors. Alternatively, the pair including the H-bridge-A 23 and the H-bridge-B 24 may drive a motor and the pair including the H-bridge-C 25 and the H-bridge-D 26 may drive another motor.

When DC motors that do not require a high electric current (hereinafter referred to as "DC(S)") are connected, the H-bridge-A 23, the H-bridge-B 24, the H-bridge-C 25, and the H-bridge-D 26 can independently drive these motors. In contrast, when DC motors that require a high electric current (hereinafter referred to as "DC(L)") are connected, both the H-bridge-A 23 and the H-bridge-B 24 drive one motor and both the H-bridge-C 25 and the H-bridge-D 26 drive another motor.

In the specifications of the DC motors, current values required for the initial torque and varistor peak current values are different for the DC(S) and the DC(L).

For example, a current value required for the initial torque of the DC(S) is 2.5 ampere (A), while that of the DC(L) is 3 A.

Figures 8, 9:
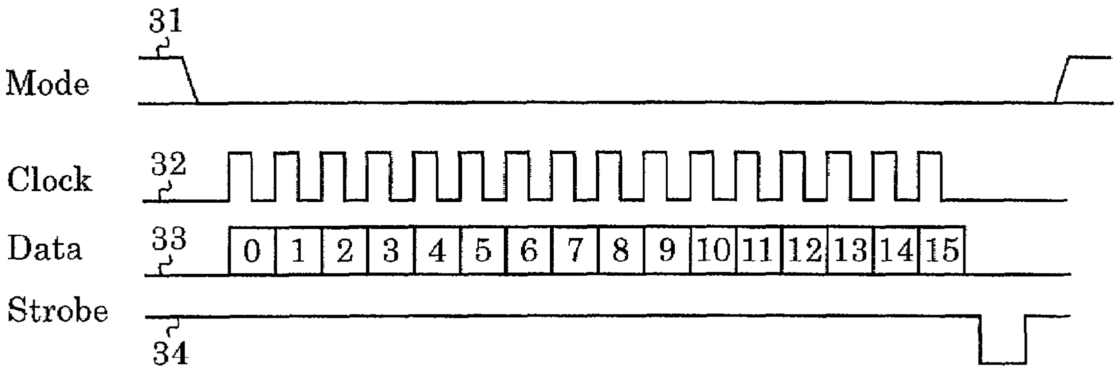
FIG. 8 is a diagram for explaining the transfer of setting data.
FIG. 9 is a diagram for explaining the setting data.
Figure 10:
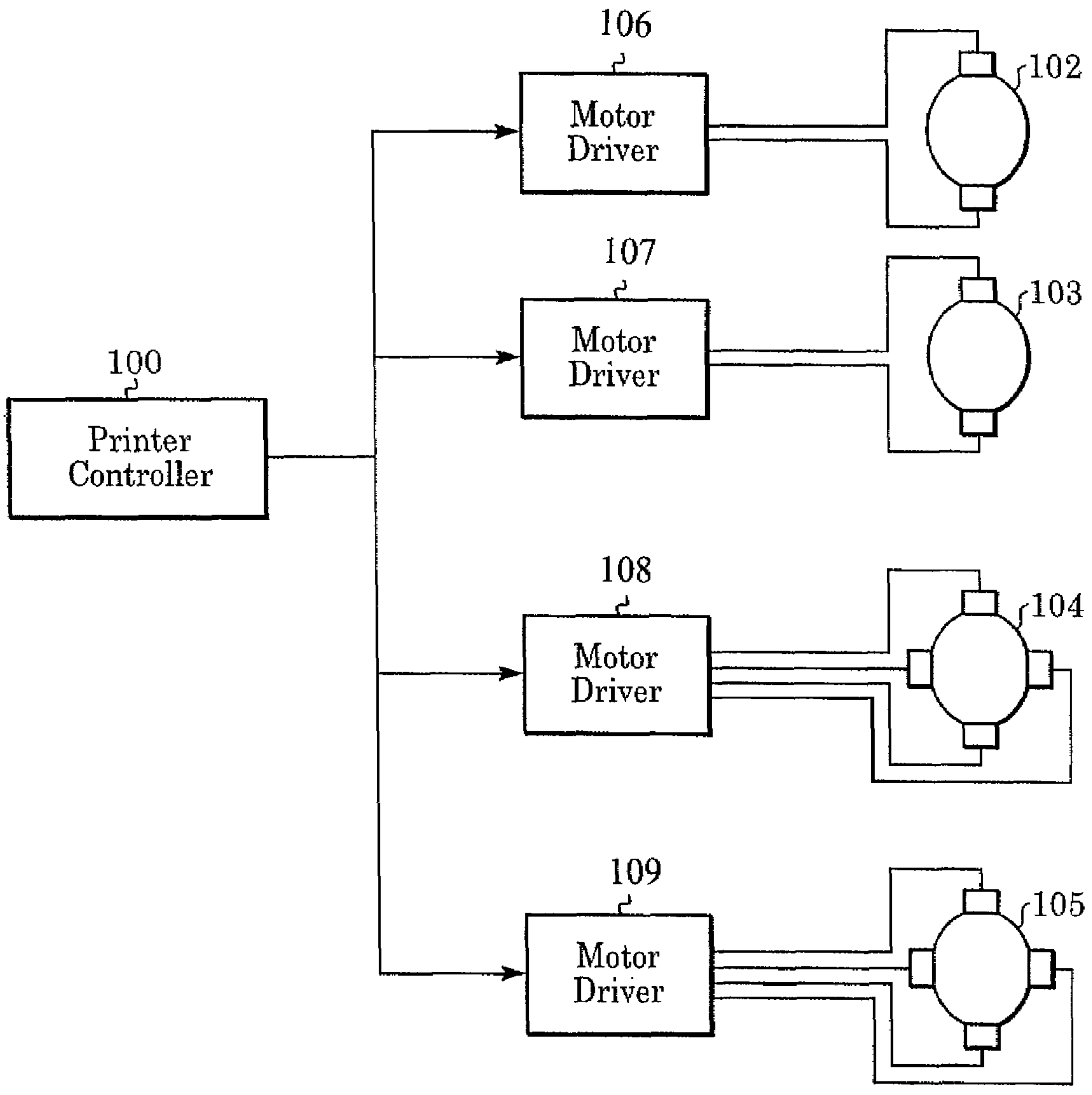
FIG. 10 (PRIOR ART)
FIG. 10 shows an example of the connection between motors and a known motor-driving circuit.
Figure 11:
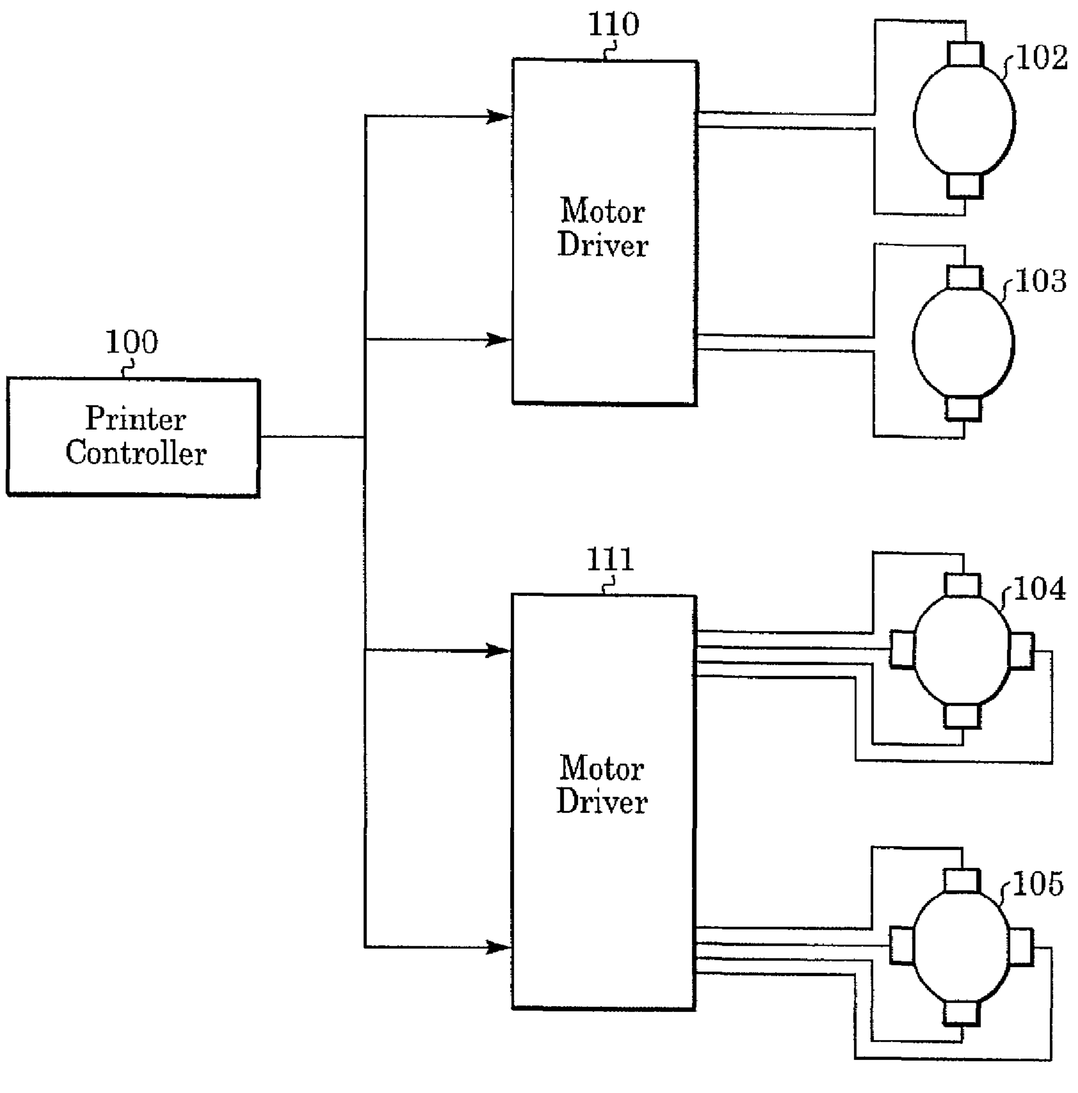
FIG. 11 (PRIOR ART)
FIG. 11 shows another example of the connection between motors and a known motor-driving circuit.
Figure 12:
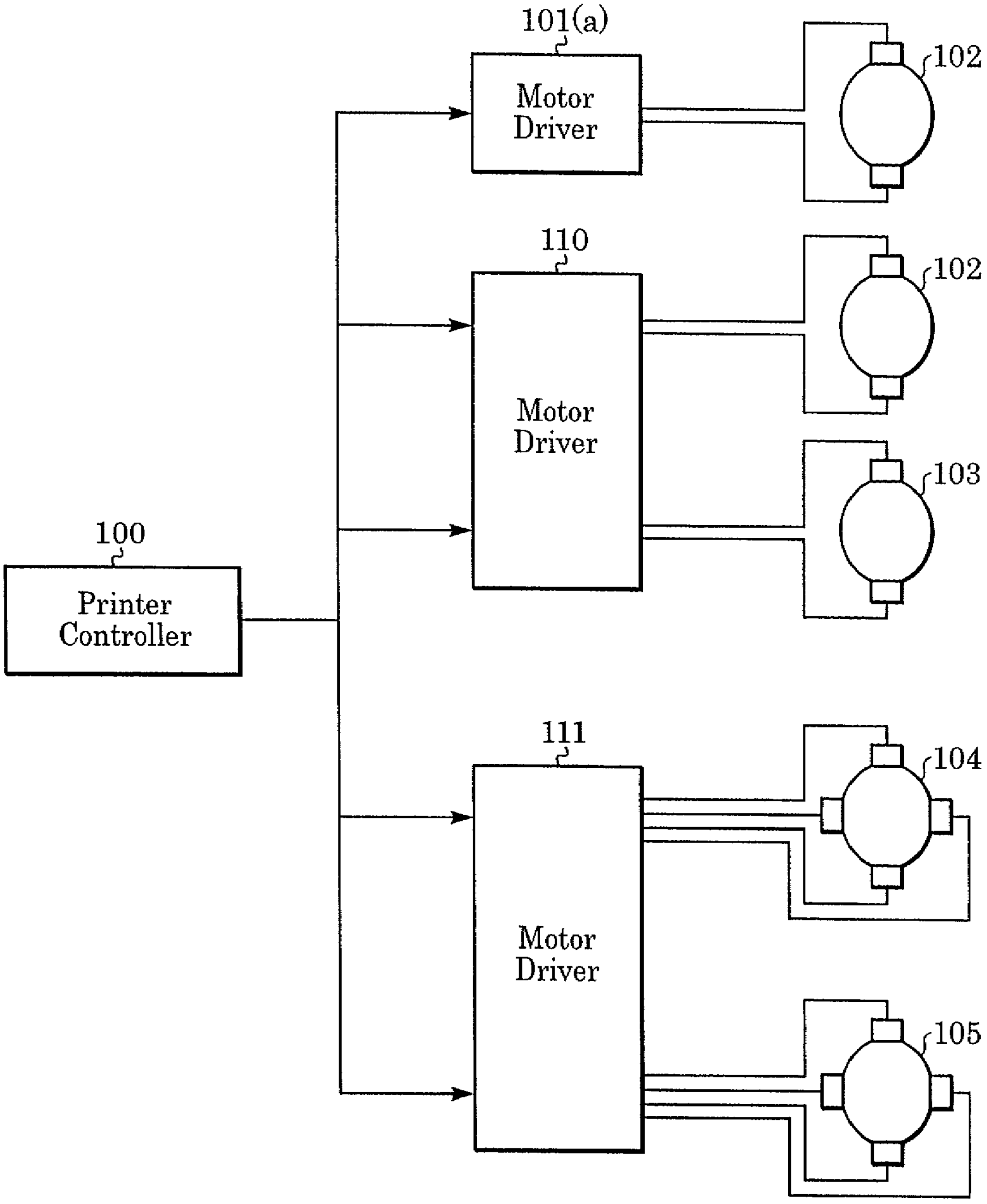
FIG. 12 (PRIOR ART)
FIG. 12 shows another example of the connection between motors and a known motor-driving circuit.

FIG. 8 is a timing chart of signals to set up a motor driver in accordance with the connected motors. The configuration of the motor driver is initially set up by four signals, that is, a mode signal 31, a clock signal 32, a data signal 33, and a strobe signal 34. The mode signal is, for example, a sleep signal. If the sleep signal is at a low level, the motor driver enters a low-power-consumption mode.

To perform the initial set-up, as shown in FIG. 8, the mode signal 31 is switched to a low level, that is, to a low-power-consumption mode. Since the motor driver is in a low-power-consumption mode, the H-bridges are not active. When the mode signal 31 is low, configuration data is transferred by the data signal 33 in synchronization with the clock signal 32. The data is determined by an edge of the strobe signal 34, for example, the falling edge of the strobe signal. Upon reception of the strobe signal 34, if the mode signal 31 is at a low level, an initial set-up is performed. On the other hand, if the mode signal 31 is at a high level, a normal set-up, that is, a set-up for driving each motor is performed.

Thus, the clock signal 32, the data signal 33, and the strobe signal 34 for the initial set-up are also used for driving the stepping motors.

In this embodiment, 16-bit data is delivered to the setting section. The first three bits, that is, bit 0, bit 1, and bit 2, determine the configuration of the motors.

Figure 3:
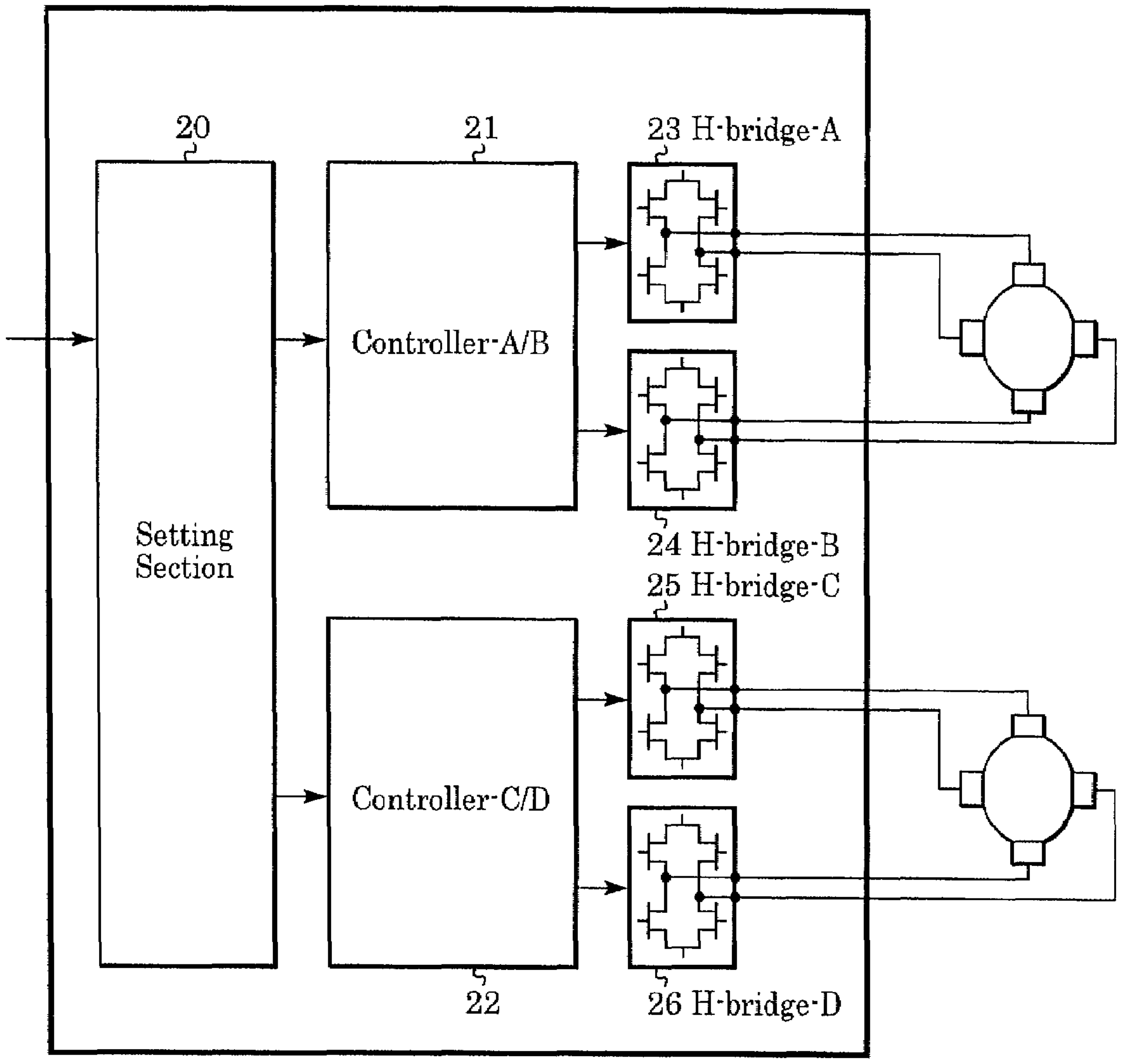
FIG. 3 shows an example of the connection between motors and the motor-driving circuit according to the embodiment.

For example, as shown in FIG. 9, a combination of bit 0=0, bit 1=0, and bit 2=0 indicates that two stepping motors are connected to the motor driver. This setting allows two stepping motors to be driven, as shown in FIG. 3.

Figure 5:
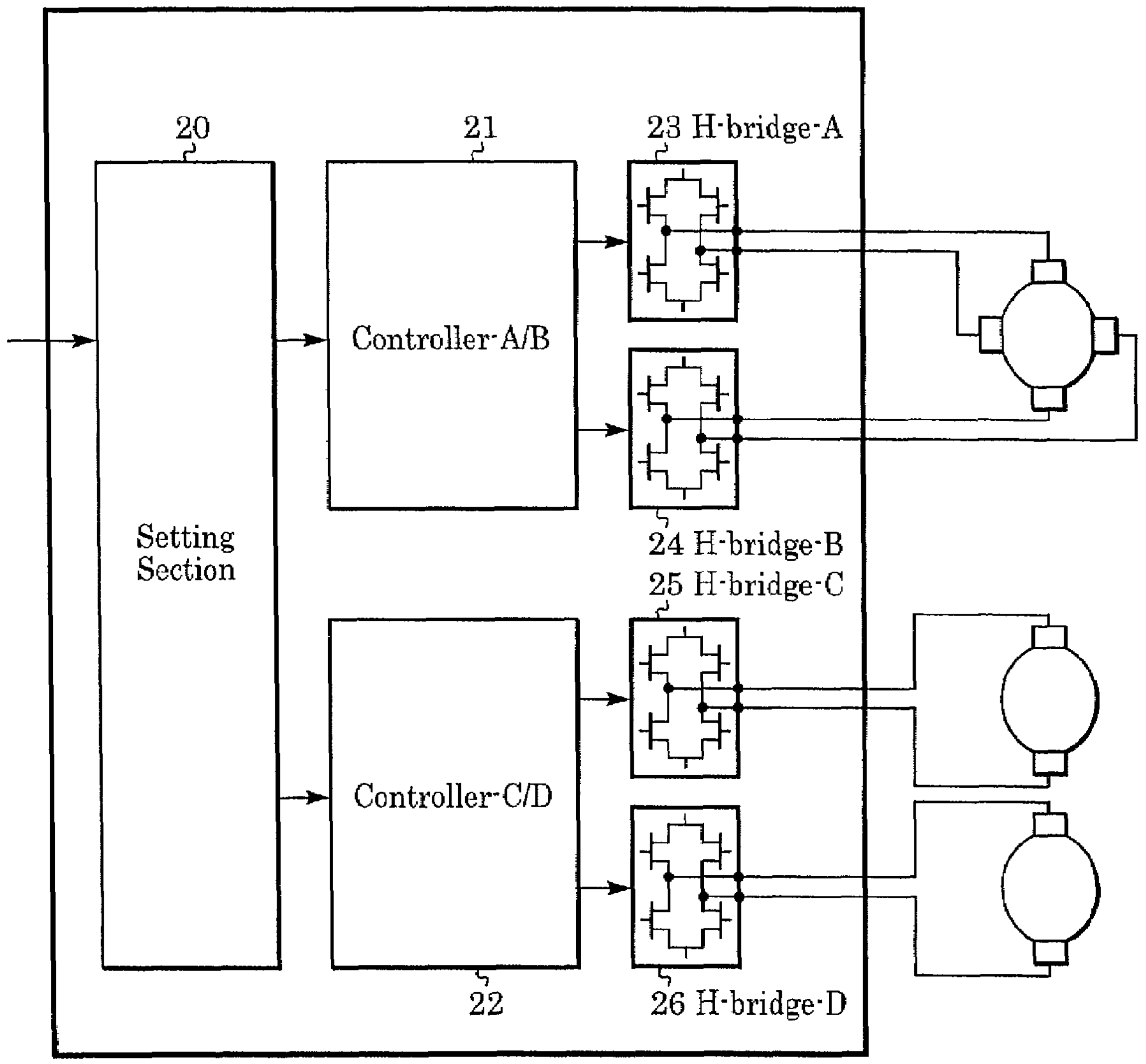
FIG. 5 shows another example of the connection between motors and the motor-driving circuit according to the embodiment.

A combination of bit 0=0, bit 1=0, and bit 2=1 indicates that one stepping motor and two DC(S)s are connected to the motor driver. This setting allows one stepping motor and two DC(S)s to be driven, as shown in FIG. 5.

Figure 4:
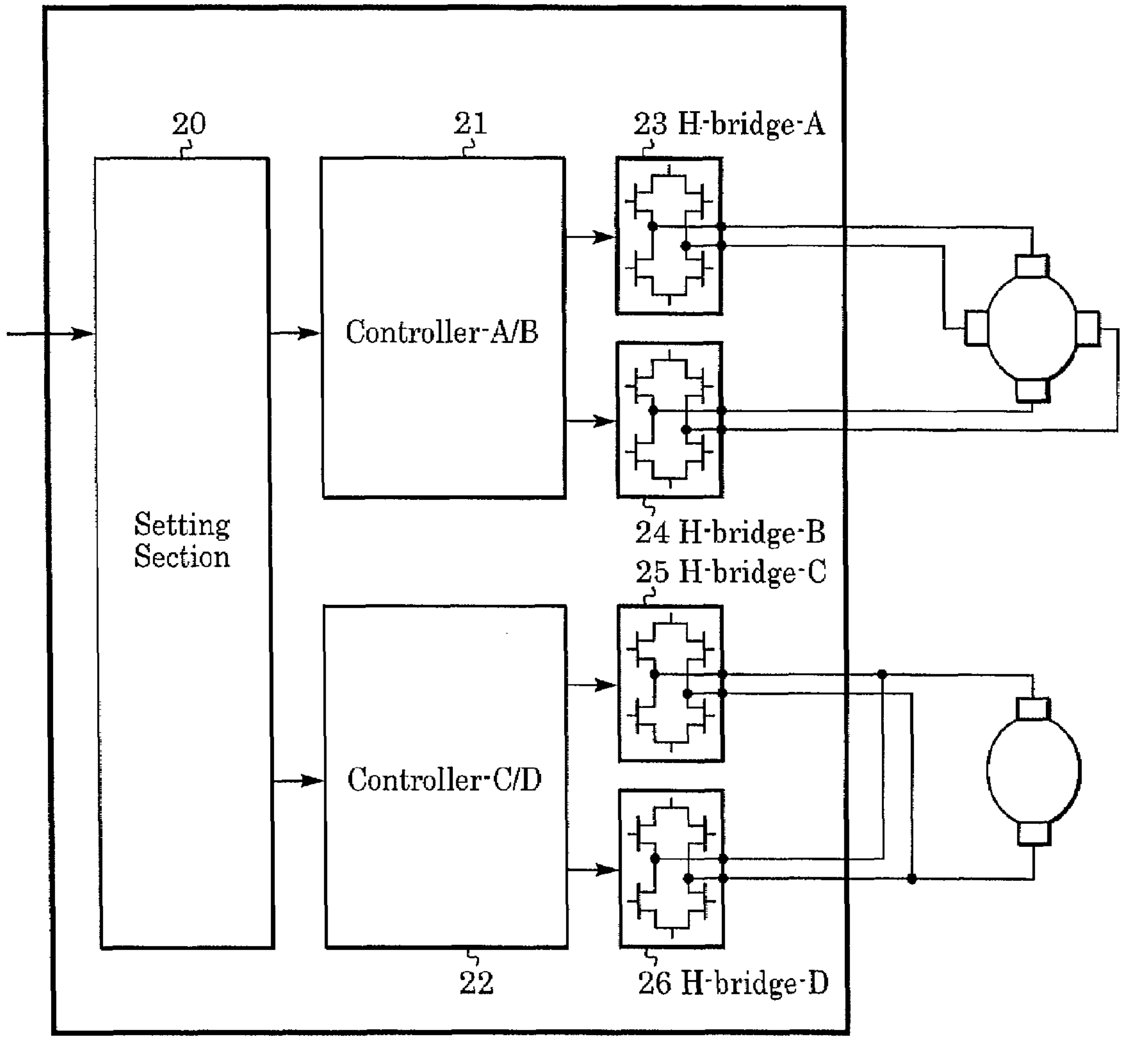
FIG. 4 shows another example of the connection between motors and the motor-driving circuit according to the embodiment.

A combination of bit 0=0, bit 1=1, and bit 2=0 indicates that one stepping motor and one DC(L) are connected to the motor driver. This setting allows one stepping motor and one DC(L) to be driven, as shown in FIG. 4.

Figure 6:
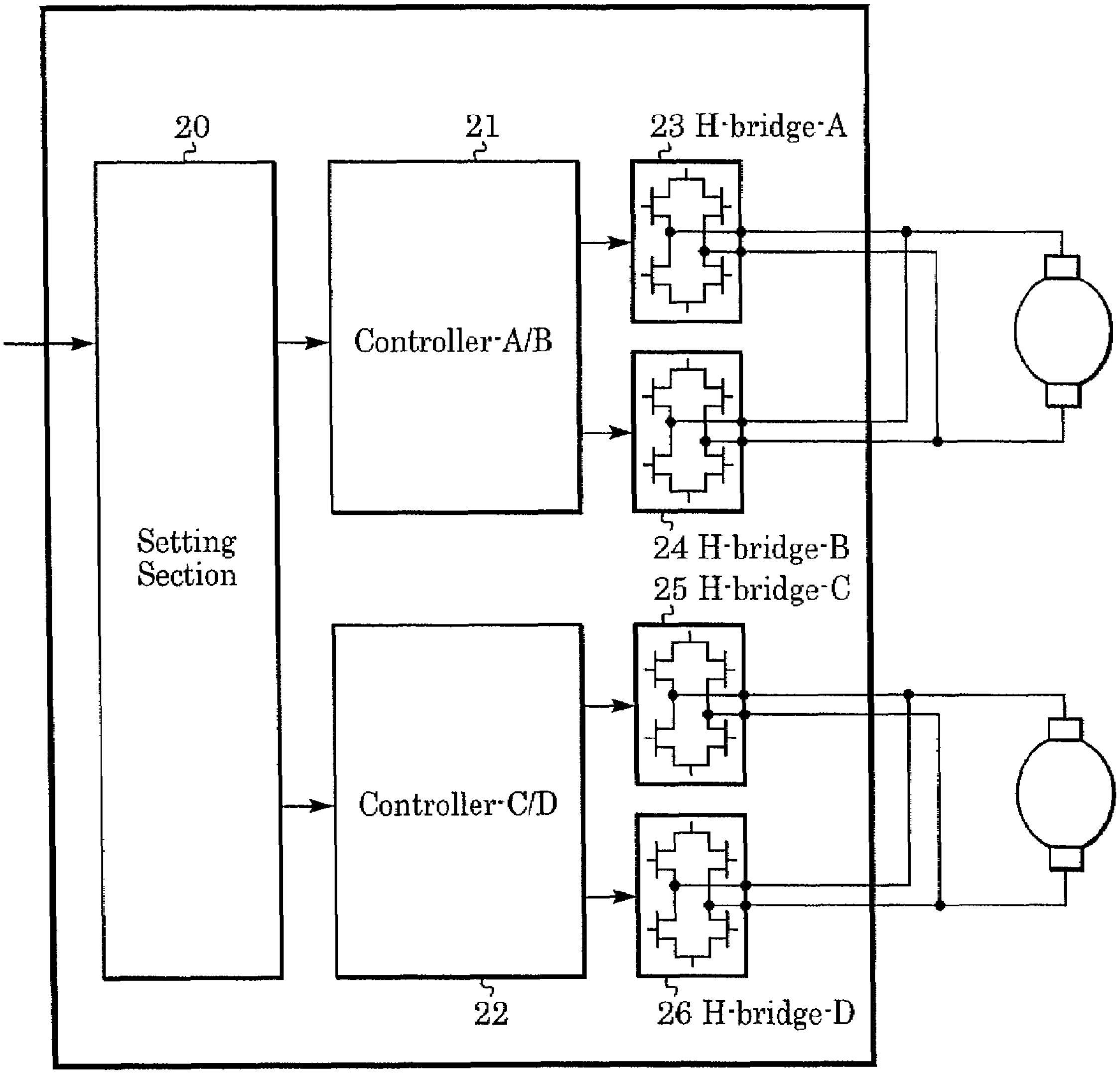
FIG. 6 shows another example of the connection between motors and the motor-driving circuit according to the embodiment.

A combination of bit 0=1, bit 1=0, and bit 2=0 indicates that two DC(L)s are connected to the motor driver. This setting allows two DC(L)s to be driven, as shown in FIG. 6.

Figure 7:
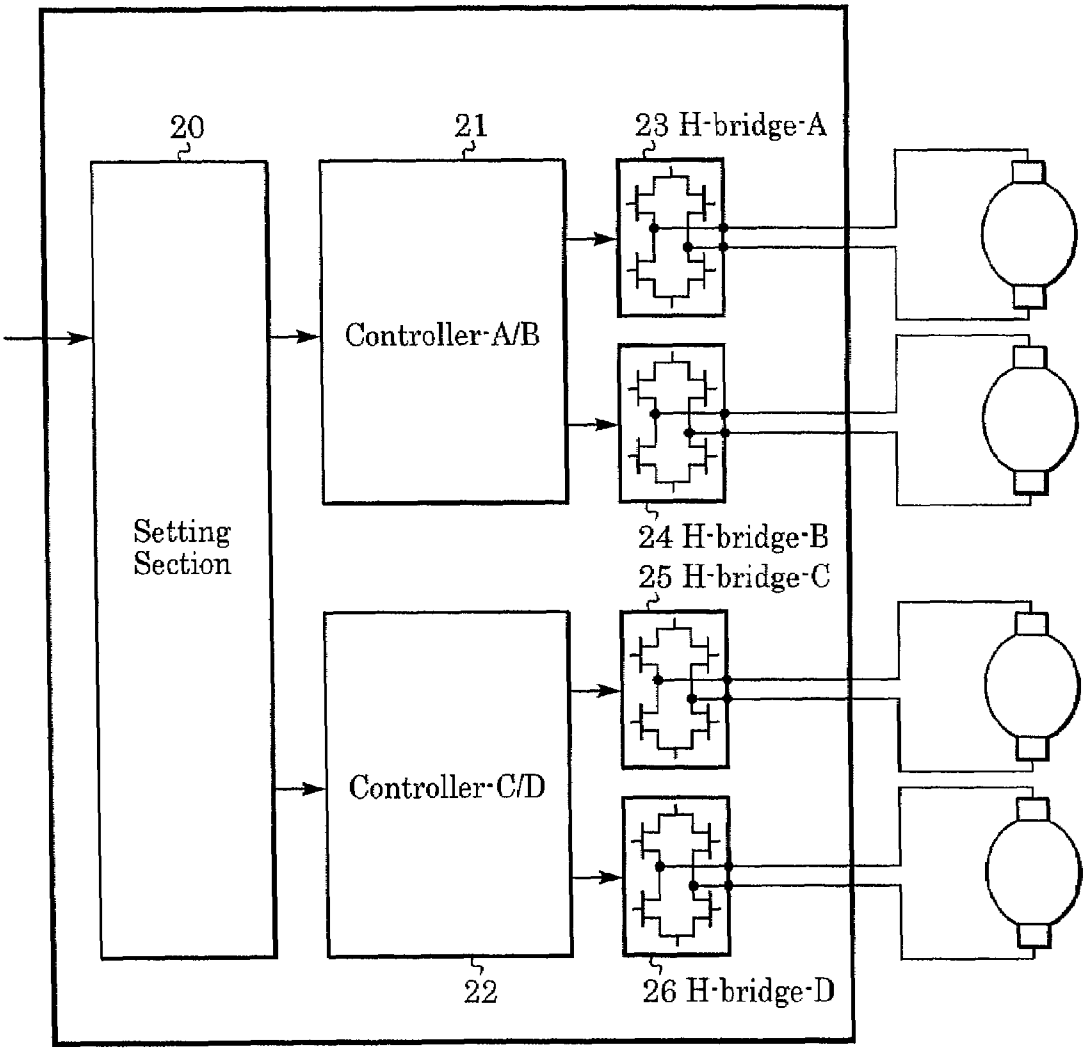
FIG. 7 shows another example of the connection between motors and the motor-driving circuit according to the embodiment.

A combination of bit 0=1, bit 1=0, and bit 2=1 indicates that four DC(S)s are connected to the motor driver. This setting allows four DC(S)s to be driven, as shown in FIG. 7.

Also, a combination of bit 0=1, bit 1=1, and bit 2=1 indicates that two DC(S)s and one DC(L) are connected to the motor driver. This setting allows two DC(S)s and one DC(L) to be driven.

A circuit configuration to drive the connected motors by the initial set-up will be described next with reference to FIG. 13.

Figure 13:
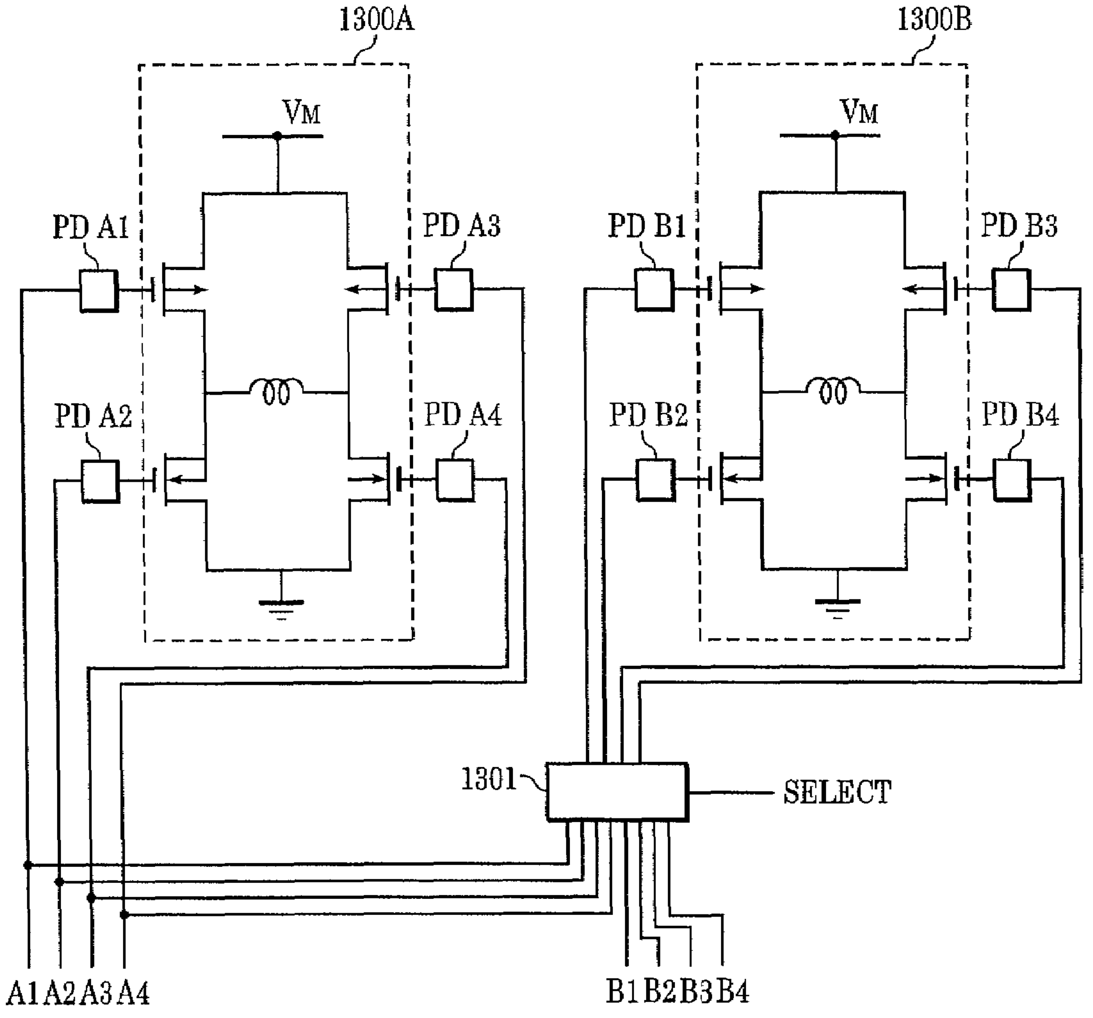
FIG. 13 is a diagram for explaining the motor-driving circuit according to the embodiment of the present invention.

As shown in FIG. 13, this circuit configuration includes H-bridge circuits 1300A and 1300B, pre-drivers PD A1 to PD A4 and PD B1 to PD B4 that drive the H-bridge circuits. Also, signal lines A1 to A4 are used for driving the pre-drivers PD A1 to PD A4. Signal lines B1 to B4 are used for driving the pre-drivers PD B1 to PD B4.

The H-bridge circuit 1300B can select either signal lines A1 to A4 or signal lines B1 to B4 with a selector 1301. This selection is performed based on the above-described setting for the motors. For example, if a DC(L) or a stepping motor is connected, the selector 1301 outputs signals from the signal lines A1 to A4 to the H-bridge circuit 1300B. If a DC(S) is connected, the selector 1301 outputs signals from the signal lines B1 to B4 to the H-bridge circuit 1300B.

Figure 14:
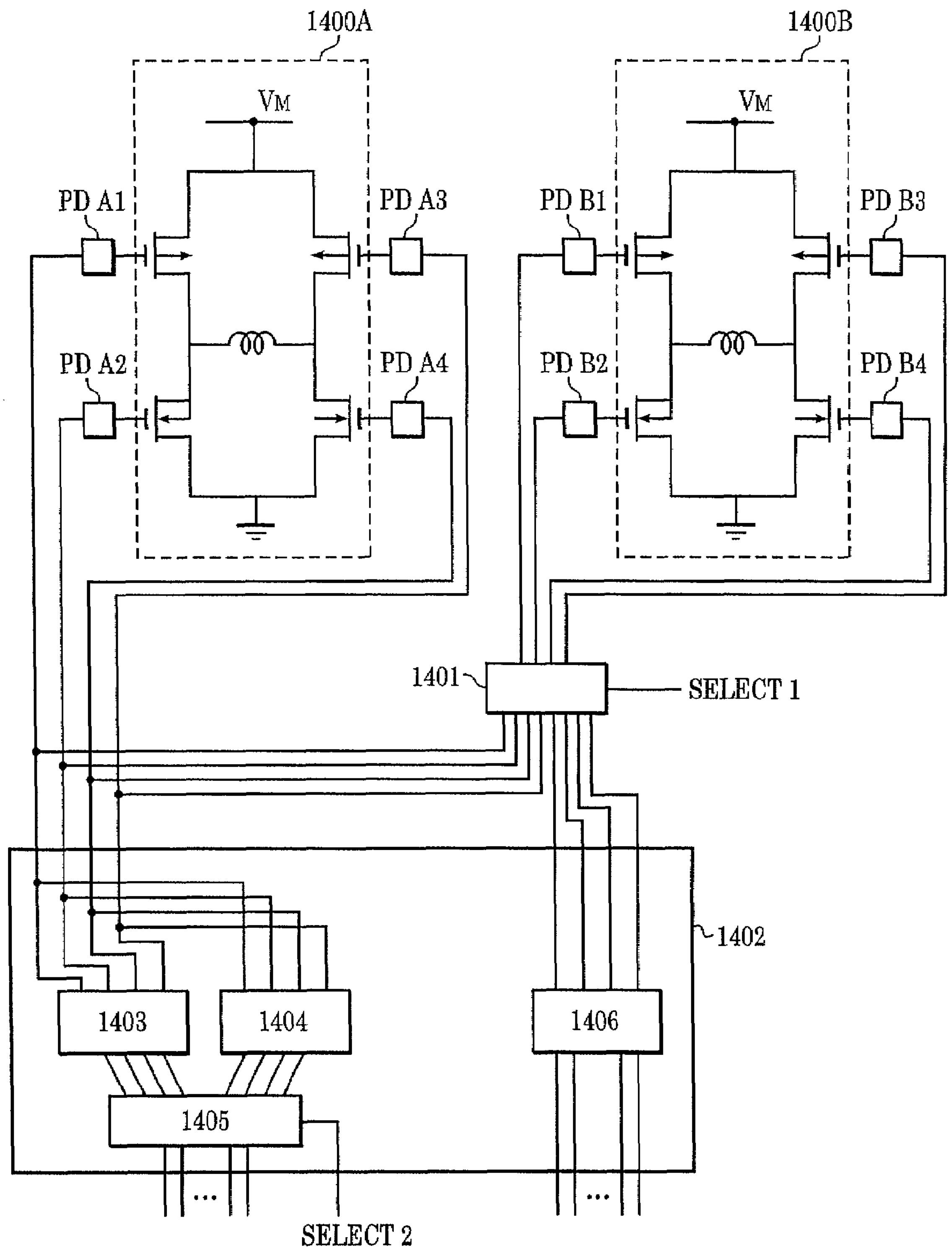
FIG. 14 is another diagram for explaining the motor-driving circuit according to the embodiment of the present invention.

Further, the circuit configuration to actually drive the connected motors will be described next with reference to FIG. 14. H-bridges 1400A and 1400B, pre-drivers PD A1 to PD A4 and PD B1 to PD B4, and a selector 1401 have the same functions as described in FIG. 13. Accordingly, their descriptions are omitted.

A block 1402 will be described below. A generator circuit 1403 generates a driving signal to drive a stepping motor. Generator circuits 1404 and 1406 generate driving signals to drive DC motors.

A selector 1405, for example, selects either the generator circuit 1403 or the generator circuit 1404 based on a signal SELECT2 and then delivers input signals to the selected generator circuit.

With reference back to FIG. 2, the setting section 20 outputs a signal SELECT1 and the signal SELECT2. The selector 1401 and the block 1402 together correspond to the controller 21 or 22. Upon receipt of the signals SELECT1 and SELECT2, the block 1402 generates driving signals.

Each generator circuit will be described next. For example, the generator circuit 1403 receives a 16-bit serial signal in synchronization with a clock signal and its latch section latches the 16-bit signal. Then, the generator circuit 1403 generates the signals A1 to A4 to drive a stepping motor based on the 16-bit value. These signals drive the H-bridge.

On the other hand, the generator circuit 1404 receives a phase signal PHASE and an enable signal, and then generates the signals A1 to A4 to drive a DC motor. The phase signal PHASE, for example, is a pulse-width-modulated (PWM) signal whose duty varies.

The generator circuit 1406 is identical to the generator circuit 1404 and, therefore, a detailed description is omitted. The generator circuit 1406 generates the signals B1 to B4 that drive a DC motor.

The motor-driving circuit includes a plurality of terminals, some of which serve as both input terminals of signals for a stepping motor and input terminals of signals for a DC motor.

For example, an input terminal of a clock signal for a stepping motor serves as an input terminal of a phase signal (a signal PHASE) for a DC(S) motor. Also, an input terminal of serial data for a stepping motor serves as an input terminal of a phase signal (the signal PHASE) for a DC(L) motor.

Consequently, the selector 1405 selects the generator circuit for a stepping motor or the generator circuit for a DC motor based on the signal SELECT2 depending on the type of the connected, namely, driven motor. Then, input signals are delivered to the selected generator circuit.

For the sake of brevity, descriptions of other signals input to the generator circuit and the motor-driving circuit without passing through the selector 1405 are omitted. A reference voltage signal from an input terminal for the DC motor is one of the examples.

As described above, various types of connection of the motors are possible by initial setting. Additionally, as shown in FIGS. 4 and 5, motors of different types can be connected to a single motor driver to be driven.

Therefore, the functions of most signals output from motor driver terminals vary in accordance with the initial setting. However, functions of a power-supply terminal, a ground terminal, and a mode signal terminal remain unchanged at all time.

At initial set-up, by assigning bit 9 to bit 12 to the corresponding motors, the damping ratio of motor reference voltage can be also set up for each motor, where bit "0" indicates a damping ratio of 1/10 and bit "1" indicates a damping ratio of 1/20.

When a printer is powered on, the CPU 1 directs the printer controller 2 to set up the configuration of the motor driver. The printer controller 2 transfers the setting data shown in FIG. 9 to the motor drivers 3 and 4 by using the control signals shown in FIG. 8.

After transferring the data, the printer controller 2 changes the mode signal 31 to a high (H) level to switch the motor drivers from a low-power-consumption mode to a normal mode, and the motor drivers 3 and 4 then receive setting data for a normal mode. The H-bridge circuits operate based on the setting data and drive the motors.

The normal mode setting includes settings of a range of electric current for torque (four levels), the rate of decrease of electric current (decay mode), and phase information (level setting for A-phase and B-phase).

Additionally, the motor drivers can drive the stepping motor in a 4-bit micro-step chopper-driving mode.

As described above, the motor drivers can be configured in accordance with the types and the number of connected motors by carrying out setting from a printer controller.

As shown in FIG. 1, the motor driver 3 can drive three DC(S)s 5, 6, and 7 while the motor driver 4 can drive two stepping motors 8 and 9.

In an example in which the present invention is applied to a recording apparatus, the DC(S) 5 is used as a carriage motor which scans a carriage having a recording head, the DC(S) 6 is used as a transfer motor which transfers recording media, such as recording paper, and the DC(S) 7 is used as a paper-outputting motor which outputs the recording media. Also, the stepping motor 8 is used as a cleaning motor for cleaning the recording head. The stepping motor 9 is used as a paper-feeding motor which feeds the recording media.

Other Embodiments

Although a printer (recording apparatus) with an inkjet recording head is described as an apparatus including the motor-driving circuits in the above-described embodiment, the present invention is not limited to the printer; the present invention may be applied to any apparatus that drives a plurality of motors.

The configuration of motors applied to a recording apparatus is not limited to the above-described configuration. For example, a DC motor may be used as the cleaning motor.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A motor-driving circuit for driving motors, comprising:

a plurality of H-bridge circuits for outputting driving signals to the motors;

an H-bridge controller for controlling the H-bridge circuits; and an H-bridge setting section for setting whether a plurality of H-bridge circuits should be independently driven or a plurality of H-bridge circuits should be driven in combination for driving a motor based on data of motor types driven in the H-bridge circuits, wherein the motor-driving circuit inputs a mode signal indicating whether a mode is a low power consumption mode or a normal mode, and wherein the H-bridge setting section performs setting whether a plurality of H-bridge circuits should be independently driven or a plurality of H-bridge circuits should be driven in combination for driving a motor in case that the mode signal indicates the low power consumption mode.

2. The motor-driving circuit according to claim 1, wherein the H-bridge setting section sets a plurality of H-bridge circuits to be driven independently in case that it drives a DC motor which does not require a large amount of electric current for driving.

3. The motor-driving circuit according to claim 1, wherein the H-bridge setting section sets a plurality of H-bridge circuits to be driven in combination in case that it drives a DC motor which requires a large amount of electric current for driving.

4. The motor-driving circuit according to claim 1, wherein the H-bridge setting section sets a plurality of H-bridge circuits to be driven in combination in case that it drives a stepping motor.

5. The motor-driving circuit according to claim 1, wherein one of the following configurations: at least one DC motor, at least one stepping motor, or at least one DC motor and one stepping motor is connected to the motor driving circuit.

6. The motor-driving circuit according to claim 1, wherein the H-bridge controller comprises a first generator circuit for generating a driving signal to drive a stepping motor and a second generator circuit for generating a driving signal to drive a DC motor, and the H-bridge controller selects either the first generator circuit or the second generator circuit based on the initial setting data.

7. The motor-driving circuit according to claim 6, wherein the first generator circuit comprises a latching unit for latching serial data to further input.

8. The motor-driving circuit according to claim 6, wherein the second generator circuit generates a driving signal by inputting a PWM signal.

9. A recording apparatus for performing a recording operation with a recording head comprising:

a controller for controlling the recording operation; and a motor-driving circuit comprising a plurality of H-bridge circuits for driving a motor based on a signal input by the controller, wherein the motor driving circuit inputs data on motor types at a predetermined timing, and the motor driving circuit sets whether a plurality of H-bridge circuits should be independently driven or a plurality of H-bridge circuits should be driven in combination for driving a motor based on the data, wherein the controller outputs a mode signal indicating whether a mode is a low power consumption mode or a normal mode, and wherein the motor driving circuit sets whether a plurality of H-bridge circuits should be independently driven or a plurality of H-bridge circuits should be driven in combination for driving a motor in case that the mode signal indicates the low power consumption mode.

10. The recording apparatus according to claim 9, wherein the motor-driving circuit further comprises a setting section for setting a plurality of H-bridge circuits to be driven independently in case that it drives a DC motor which does not require a large amount of electric current for driving.

11. The recording apparatus according to claim 9, wherein the motor-driving circuit further comprises a setting section for setting a plurality of H-bridge circuits to be driven in combination in case that it drives a DC motor which requires a large amount of electric current for driving.

12. The recording apparatus according to claim 9, wherein the motor-driving circuit further comprises a setting section for setting a plurality of H-bridge circuits to be driven in combination in case that it drives a stepping motor.

13. The recording apparatus according to claim 9, wherein the motor-driving circuit inputs serial data based on a mode signal and a clock signal.

14. The recording apparatus according to claim 9, wherein the predetermined timing is at turning on of a power source of the recording apparatus.

15. The recording apparatus according to claim 9, wherein the motor-driving circuit comprises a first generator circuit for generating a driving signal to drive a stepping motor and a second generator circuit for generating a driving signal to drive a DC motor, and the motor-driving circuit selects either the first generator circuit or the second generator circuit based on the initial setting data.

16. An apparatus including a motor-driving circuit comprising:

a controller for controlling an operation of a unit; and a motor-driving circuit comprising a plurality of H-bridge circuits for driving a motor based on a signal input by the controller, wherein the motor driving circuit inputs data on motor types at a predetermined timing, and the motor driving circuit sets whether a plurality of H-bridge circuits should be independently driven or a plurality of H-bridge circuits should be driven in combination for driving a motor based on the data.

17. The apparatus according to claim 16, wherein the apparatus is a recording apparatus.

18. The motor-driving circuit according to claim 1, wherein the H-bridge setting section performs setup for motor to be driven in case that the mode signal indicates the normal mode.

19. The motor-driving circuit according to claim 6, wherein the motor-driving circuit further comprises an input terminal, the input terminal of a clock signal for the stepping motor serving as an input terminal of a phase signal for the DC motor.

* * * * *